Figure 1:
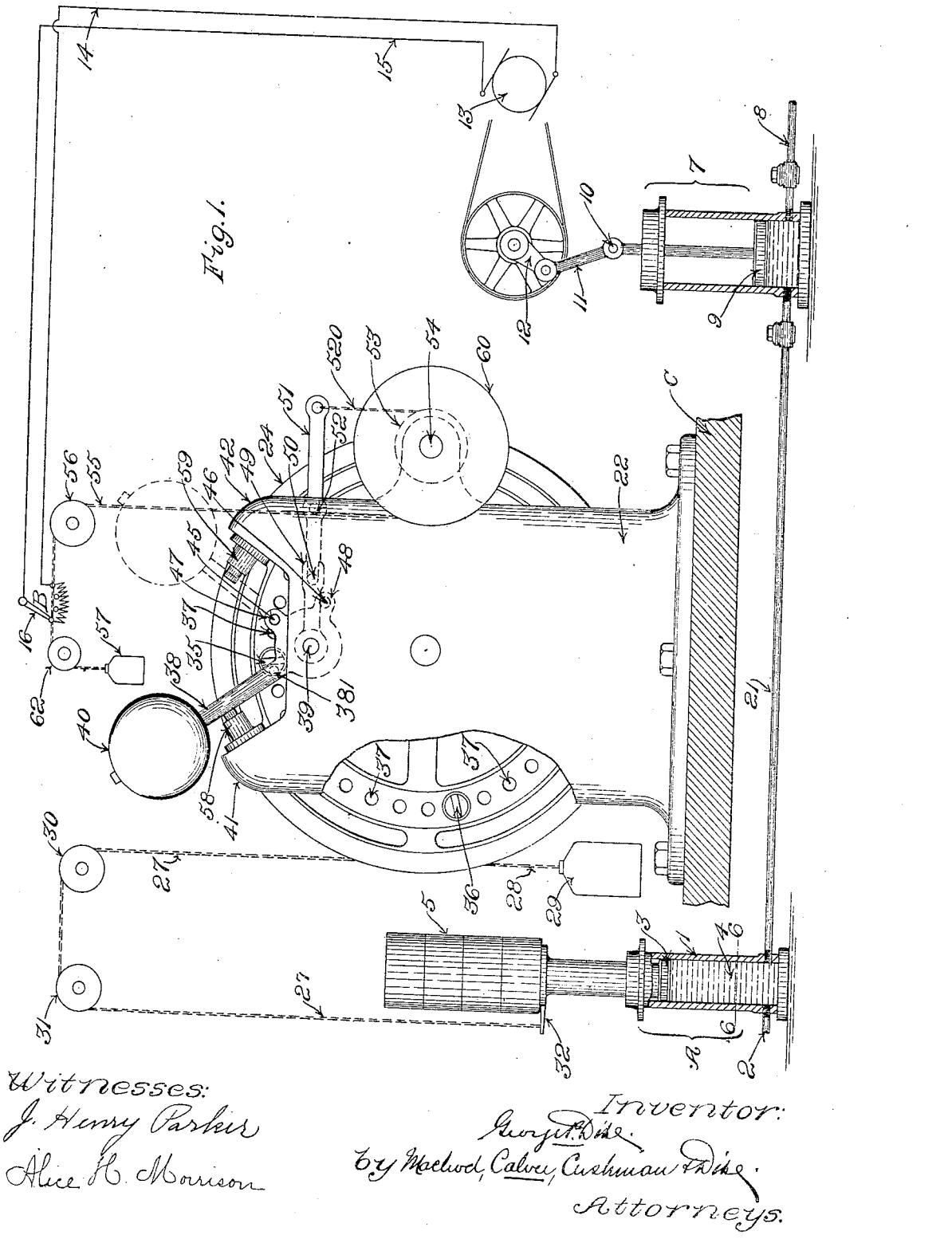

No. 825,383. PATENTED JULY 10, 1906.
G. P. DIKE.
ACCUMULATOR CONTROLLER.
APPLICATION FILED JAN. 7, 1905.

2 SHEETS—SHEET 2.

Witnesses:
J. Henry Parker
Alice L. Morrison

Inventor:
George P. Dike.
by Macleod, Calver, Cushman & Dike.
Attorneys.

UNITED STATES PATENT OFFICE

GEORGE P. DIKE, OF NEWTON, MASSACHUSETTS, ASSIGNOR TO MASON REGULATOR COMPANY, OF BOSTON, MASSACHUSETTS, A CORPORATION OF MAINE.

ACCUMULATOR-CONTROLLER.

No. 825,383.   Specification of Letters Patent.   Patented July 10, 1906.

Application filed January 7, 1905. Serial No. 240,018.

*To all whom it may concern:*

Be it known that I, GEORGE P. DIKE, a citizen of the United States, residing at Newton, county of Middlesex, State of Massachusetts, have invented a certain new and useful Improvement in Accumulator-Controllers, of which the following is a specification, reference being had therein to the accompanying drawings.

My invention relates to controllers for regulating the supply of water under pressure to accumulators or the like, and has the same objects and general functions as the accumulator-controller shown in the application of William B. Mason for United States Letters Patent, filed March 23, 1904, Serial No. 200,950. As is stated in that application, the fluid contained in the accumulator is forced into it by a pump and a uniform pressure is maintained within the accumulator regardless of the amount of fluid within it. This uniformity of pressure is maintained by a piston weighted according to the pressure which it is desired to maintain in the fluid. It is desirable that the pump supplying fluid to the accumulator shall be started only when the supply of fluid in the accumulator is nearly exhausted and shall be stopped when the accumulator is filled to its utmost capacity and not started again until the fluid therein is again nearly exhausted.

The present invention is not intended to supersede the device shown in the application above referred to, but to afford another form which may be more desirable to be used under certain circumstances.

The form of controller illustrated in the application of William B. Mason above referred to consists, essentially, of a tappet-carrier operated by connection with the accumulator, a tilt-lever or falling ball operated by the carrier at certain periods in its stroke, a valve operated by the movement of the falling ball, and a fluid-pressure motor whose operation is controlled by the valve. The power for the operation of this fluid-pressure motor is generally supplied by water under pressure from city mains, &c. The fluid-pressure motor in its turn moves the rheostat of an electrically-driven pump or the throttle-valve of a steam-driven pump.

In my invention I arrange the parts so that the rheostat or throttle or other motive-power controller may be moved directly by the operation of the tilt-lever or falling ball without the intervention of the valve and motor. By this means I am enabled to produce an accumulator-controller which does not require the use of a motor or water under pressure, and therefore may be used in places where this is not readily obtainable. This construction is also much simpler than the previous construction and is under proper conditions equally reliable. Of course it is necessary to make the tilt-lever or falling ball much more forcible in its operation to give it sufficient power to move the motive-power controller and the intermediate connections. Where the motive-power controller requires a considerable amount of force to move it this device may not be as desirable on account of the large size necessary to be given to the falling ball or the great strength necessary if a spring is used in its place, this being liable to produce jars which may do damage to the construction of the controller; but, on the other hand, where little force is required to move the rheostat or throttle-lever and where speed is desirable in the movement, as is particularly the case where an electrically-driven pump is used, a device embodying my invention is preferable because it affords a quicker movement than a fluid-pressure-operated controller.

The invention will be fully understood from the following description, taken in connection with the accompanying drawings, and the novel features thereof will be pointed out and described in the claims at the close of this specification.

Figure 2:
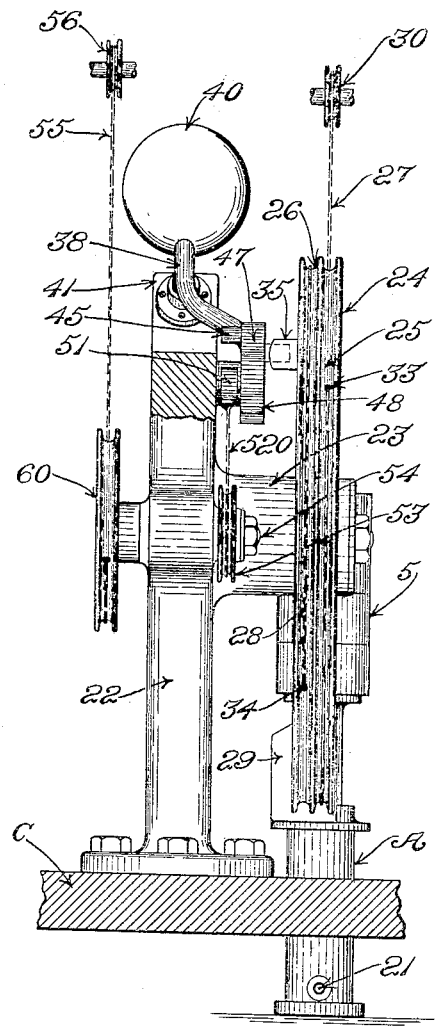

Figure 1 is a front elevation, and Fig. 2 a side elevation, of a device embodying my invention.

I have illustrated my invention in the accompanying drawings in connection with an electrically-driven pump the flow of current to the motor of which is controlled by a rheostat, because that is the species of device to which this invention is particularly applicable. It will be clear, however, that the device shown may be employed to operate the throttle-valve of a steam-pump or to operate any similar mechanism by the movement of which the supply of power to the pump is controlled.

Referring to the drawings, A represents an accumulator of the ordinary well-known construction, consisting of a cylinder 1, provided with an outlet 2, and a piston 3, which is provided with suitable weights, as shown at 5. In the drawings the accumulator-piston 3 is shown as at the top of its stroke. A pump is indicated at 7, having an inlet 8 connected with the accumulator by the pipe 21. The piston of the pump is indicated at 9 and is attached at 10 to the connecting-rod 11. The connecting-rod 11 is attached at its upper end to the crank 12, which is driven by the motor 13, diagrammatically indicated. The wires 14 and 15 connect with the rheostat B, the movable member of which is indicated by the numeral 16. All of the foregoing parts are old and well known and are shown for convenience in understanding the operation of my device.

Supported upon a suitable base C is a supporting-frame 22. Extending sidewise from a suitable point on this frame 22 is a hub 23, loose upon which is mounted a tappet-carrier 24. This tappet-carrier is provided with two grooves 25 and 26 in its rim suitable for the reception and guidance of a pair of chains 27 and 28, which are connected with a moving part of the accumulator A and with a counterweight 29, respectively. The chain 27 passes for convenience over the sheaves 30 and 31 and is attached to the arm 32 on the piston-rod of the accumulator. The two chains 27 and 28 are attached to the rim of the tappet-carrier at 33 and 34, respectively. The counterweight 29 operates to turn the tappet-carrier 24 in the opposite direction from that in which it is turned by the movement of the chain 27, which is connected with the accumulator, thus always maintaining both chains in a tight condition.

A pair of tappets 35 and 36 are placed at suitable points on the surface of the tappet-carrier 24, the tappet-carrier being provided with a series of holes 37 for the reception of these tappets. By this means the tappets may be located at any desired point in the circumference of the tappet-carrier, and thus an adjustment for the mechanism provided.

A tilt-lever 38 is pivoted to the upper portion of the frame 22 at 39 and is provided with a heavy ball 40 at its outer or upper end. The frame 22 is made to form at its upper extremity two arms 41 and 42 to support the tilt-lever 38 in its two extreme positions, the right-hand position being shown in dotted lines. The lower end of the tilt-lever 38 is also furnished with a pair of pins 45 and 46, situated on arms or projections 47 and 48, respectively. These two pins 45 and 46 are adapted to contact with a fork-lever 49, which is pivoted at the same point as the tilt-lever and has a fork at its other extremity, the members of which are adapted to engage a pin 50 on the inner end of an intermediate lever 51, pivoted at 52 to the frame 22 of the machine. This intermediate lever 51 operates by means of a chain 520 to turn a wheel 53, supported on the frame 22 of the machine by an axle 54. A second wheel 60 is fast upon the other end of the axle 54 and is provided with a groove in which lies a chain 55, which passes over a sheave 56 and connects with the rheostat-arm 16. To take up the slack in this chain and to move the rheostat-lever 16 in the opposite direction from which it is moved by the operation of the chain 55, this chain is extended beyond the end of the rheostat-arm 16 over a sheave 62, and a counterweight 57 is hung upon its lower end.

As it is necessary to provide a ball 40 for the end of the tilt-lever 38 having a very considerable weight and as the sudden movement of the ball from one position to the other would be very likely to jar or materially injure the parts of the mechanism if it were allowed to fall directly upon the extremities of the arms 41 and 42, I furnish these two arms with a pair of cushions 58 and 59 of any suitable form which shall receive and take up the force of the blow given by the tilt-lever in its movement. These cushions 58 and 59 may contain a spring or a piece of rubber; but I prefer to use a simple dash-pot, because with it there is no danger of the tilt-lever rebounding, as is the case where a spring-cushion is used. I have not shown this in detail, dash-pots being of well-known construction.

The operation of my machine is as follows: Fig. 1 represents the accumulator as at the extreme upward point of its movement, the power to the pump 7 having just been cut off by means of the rheostat B. As the fluid contained in the accumulator A is used up the piston 3 with the weights 4 thereon gradually fall until a predetermined point—as, for instance, that indicated by the line 6 6—is reached. The downward movement of the piston 3 pulls downwardly the chain 27, thus turning with it the tappet-carrier 24 about its pivot. The rotation of the tappet-carrier 24 causes the tappet 36 to engage the pin 381 on the tilt-lever 38. The continued movement of the tappet-carrier 24 lifts the tilt-lever 38 and the weighted ball 40 thereon to the vertical position, moving it about its pivot 39. Immediately after passing the vertical position the tilt-lever and weight thereon fall rapidly to the dotted-line position, (indicated in Fig. 1,) and the pin 45 on the tilt-lever engages the upper side of the forked lever 49 and causes it to move about its pivot 39. An upward movement of the outer or right-hand end of the intermediate lever 51 results, and the chain 520 is drawn upwardly, causing the wheel 53 to rotate a corresponding amount. This rotation of the wheel 53 winds a portion of the chain 55 about the circumference of the wheel 60 and moves the rheostat-arm 16 to the right, thus immediately completing the circuit of the pump-motor 13 and starting the pump again.

Of course it is to be understood that the position of the tappet 36 upon the tappet-carrier is so adjusted that the tilt-lever 38 will have to be lifted by the tappet to the vertical position when the piston of the accumulator has reached the point of its downward stroke at which it is desired to start the pump again. With the starting of the pump the accumulator begins to be refilled with the fluid under pressure, and the piston 3 rises correspondingly, slackening the chain 27 and allowing it to be rewound upon the circumference of the tappet-carrier 24 by the action of the counterweight 29. This reverse movement of the tappet-carrier 24 brings the other tappet 36 into contact with the pin 381, lifting the tilt-lever 38 to the vertical position, from which it falls to the full-line position seen in Fig. 1. The outer or right-hand end of the intermediate lever 51 is lowered by the movement of the tilt-lever, which enables the counterweight 57 to draw the chain 55 and attached rheostat-arm 16 to the left. The electric power to the pump 13 is thus cut off and the pump 9 stopped. The point at which these operations are caused to take place may be adjusted by varying the location of the tappets on the tappet-carrier, and the length of movement necessary to operate the rheostat-arm under varying circumstances may be allowed for by varying the length of the arms of the intermediate lever 51 and the relative diameters of the wheels 53 and 60.

What I claim is—

1. In a machine of the character specified, in combination, an accumulator, a tilt-lever, knocking-over means therefor operatively connected with the said accumulator, and a motive-power controller operated by the movement of the said tilt-lever.

2. In a machine of the character specified, in combination, an accumulator, a pump, a motor therefor, controlling means for said motor, a tilt-lever, knocking-over means therefor operated by movement of said accumulator, an intermediate lever operated by said tilt-lever, and a motive-power controller operated by the movement of the said intermediate lever.

In testimony whereof I affix my signature in presence of two witnesses.

GEORGE P. DIKE.

Witnesses:
ALICE H. MORRISON,
WILLIAM A. COPELAND.